US010132913B2

(12) United States Patent
Ogura et al.

(10) Patent No.: US 10,132,913 B2
(45) Date of Patent: Nov. 20, 2018

(54) PHOTOGRAPHING APPARATUS, PHOTOGRAPHING METHOD, TEMPLATE CREATION APPARATUS, TEMPLATE CREATION METHOD, AND PROGRAM

(71) Applicant: Sony Corporation, Tokyo (JP)

(72) Inventors: Sho Ogura, Kanagawa (JP); Takehiro Hamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 274 days.

(21) Appl. No.: 14/283,842

(22) Filed: May 21, 2014

(65) Prior Publication Data
US 2014/0362238 A1 Dec. 11, 2014

(30) Foreign Application Priority Data

Jun. 11, 2013 (JP) ................................. 2013-123087

(51) Int. Cl.
*H04N 5/225* (2006.01)
*G01S 3/786* (2006.01)
*H04N 5/232* (2006.01)
*G06K 9/00* (2006.01)
*G06K 9/62* (2006.01)
*G06T 7/246* (2017.01)

(52) U.S. Cl.
CPC ........ *G01S 3/7864* (2013.01); *G06K 9/00926* (2013.01); *G06K 9/6202* (2013.01); *G06T 7/248* (2017.01); *H04N 5/232* (2013.01); *H04N 5/23296* (2013.01); *G06T 2207/20081* (2013.01); *G06T 2207/30196* (2013.01)

(58) Field of Classification Search
CPC ..... G01S 3/7864; G01S 3/7865; H04N 5/232; H04N 7/181; G06T 7/2033; G06T 2207/10016; G08B 13/19602; G08B 13/19634; G08B 13/19641; G08B 13/19645
See application file for complete search history.

(56) References Cited

U.S. PATENT DOCUMENTS

| 2005/0018879 A1* | 1/2005 | Ito ..................... G08B 13/19602 382/103 |
| 2008/0158361 A1* | 7/2008 | Itoh .................. G08B 13/19602 348/155 |
| 2009/0033745 A1* | 2/2009 | Yeredor ................ G01S 3/7864 348/152 |

(Continued)

FOREIGN PATENT DOCUMENTS

JP 5116605 B2 10/2012

*Primary Examiner* — Sinh Tran
*Assistant Examiner* — Selam Gebriel
(74) *Attorney, Agent, or Firm* — Michael Best & Friedrich LLP

(57) ABSTRACT

A photographing apparatus includes a position estimation unit and a photographing control unit. The position estimation unit is configured to use a long-term template of a target to be tracked and a short-term template of the target to be tracked, which are created from a past taken image, to estimate a position of the target to be tracked in a current taken image. The long-term template is a template updated at a longer interval, and the short-term template is a template updated at a shorter interval. The photographing control unit is configured to control photographing on the basis of the position estimated by the position estimation unit.

18 Claims, 6 Drawing Sheets

(56) References Cited

U.S. PATENT DOCUMENTS

| 2010/0165113 | A1* | 7/2010 | Abe | G06K 9/6203 |
| | | | | 348/169 |
| 2011/0109759 | A1* | 5/2011 | Abe | G06T 7/277 |
| | | | | 348/222.1 |
| 2012/0162416 | A1* | 6/2012 | Su | G06T 7/2053 |
| | | | | 348/143 |
| 2013/0272570 | A1* | 10/2013 | Sheng | G06F 3/017 |
| | | | | 382/103 |

* cited by examiner

PHOTOGRAPHING APPARATUS, PHOTOGRAPHING METHOD, TEMPLATE CREATION APPARATUS, TEMPLATE CREATION METHOD, AND PROGRAM

CROSS REFERENCE TO RELATED APPLICATIONS

This application claims the benefit of Japanese Priority Patent Application JP 2013-123087 filed Jun. 11, 2013, the entire contents of which are incorporated herein by reference.

BACKGROUND

The present disclosure relates to a photographing apparatus, a photographing method, a template creation apparatus, a template creation method, and a program. In particular, the present disclosure relates to a photographing apparatus, a photographing method, a template creation apparatus, a template creation method, a program capable of performing tracking and photographing by using an optimal template of a target to be tracked.

An automatic tracking camera is a monitoring camera (PTZ (Pan/Tilt/Zoom) camera) that estimates a position of a target to be tracked which is automatically or manually selected and performs PTZ control in such a manner that the target to be tracked is positioned on the center of a taken image within a predetermined size range.

In such an automatic tracking camera, the target to be tracked typically exists on the center of the taken image, so a surveillant does not have to make a search for a suspicious person, which reduces a burden on the surveillant. Further, it is possible to track the target to be tracked and take an image thereof, so a surveillance possible range per camera is increased. Therefore, it is possible to reduce the number of cameras to be installed and thus reduce cost.

In the automatic tracking camera, as a method of estimating a position of the target to be tracked, there is a first method of obtaining an optical flow from past and current images and setting an area including a movement as the target to be tracked, thereby estimating the position of the target to be tracked. Further, there is a second method of determining a difference between a back ground image of a past image and a current image and setting an area with a larger difference as the target to be tracked, thereby estimating the position of the target to be tracked.

However, if there are a plurality of moving objects, specifying the target to be tracked is difficult by the first and the second methods. In view of this, there has been proposed a third method of learning a feature such as color of the target to be tracked and estimating the position of the target to be tracked on the basis of the feature.

Here, in the case where a surveillant specifies a first position of the target to be tracked, information relating to a first template of the target to be tracked is highly reliable. However, the feature of the target to be tracked varies depending on a posture, brightness, or the like of the target to be tracked. Therefore, in the third method, the feature of the target to be tracked has to be learned in real time.

For example, Japanese Patent No. 5116605 discloses a method of updating a template of the target to be tracked on a frame basis, learning a feature thereof, and estimating the position of the target to be tracked on the basis of the feature. In the method disclosed in Japanese Patent No. 5116605, a particle filter is used for the feature calculated in learning, thereby estimating the position and a size of the target to be tracked. A template (sample) of the target to be tracked which is used for learning is a part of the particle, and a template of a background image is a remaining particle.

SUMMARY

As described above, in the first method disclosed in Japanese Patent No. 5116605, the template of the target to be tracked is updated on the frame basis. However, in some cases, the feature of the target to be tracked just temporarily varies and returns to its original state. For example, in the case where the target to be tracked is a person, a way of walking of a person has regularity. Therefore, the person has highly probably taken the same posture of the person in a relatively remote past. For this reason, it is desirable that not only a preceding template of the target to be tracked but also a template of the target to be tracked in the relatively remote past is also used to learn the feature of the target to be tracked.

In view of the circumstances as described above, it is desirable to make it possible to perform tracking and photographing by using an optimal template of the target to be tracked.

According to a first embodiment of the present disclosure, there is provided a photographing apparatus including a position estimation unit and a photographing control unit. The position estimation unit is configured to use a long-term template of a target to be tracked and a short-term template of the target to be tracked, which are created from a past taken image, to estimate a position of the target to be tracked in a current taken image. The long-term template is a template updated at a longer interval, and the short-term template is a template updated at a shorter interval. The photographing control unit is configured to control photographing on the basis of the position estimated by the position estimation unit.

A photographing method and a program according to the first embodiment of the present disclosure correspond to the photographing apparatus according to the first embodiment of the present disclosure.

In the first embodiment of the present disclosure, the long-term template which is the template of the target to be tracked updated at a longer interval and the short template which is the template of the target to be tracked updated at the shorter interval are used, thereby estimating the position of the target to be tracked in the current taken image and controlling photographing on the basis of the position estimated.

According to a second embodiment of the present disclosure, there is provided a template creation apparatus including a template creation unit and a holding unit. The template creation unit is configured to create a template of a target to be tracked from a taken image. The holding unit is configured to hold the template created by the template creation unit with the template classified as one of a long-term template updated at a longer interval and a short-term template updated at a shorter interval.

A template creation method and a program according to the second embodiment of the present disclosure correspond to the template creation apparatus according to the second embodiment of the present disclosure.

In the second embodiment of the present disclosure, a template of the target to be tracked is created from a taken image, and the template is classified as one of a long-term template updated at a longer interval and a short-term template updated at a shorter interval and held.

The photographing apparatus according to the first embodiment and the template creation apparatus according to the second embodiment may be independent of each other or may be internal blocks that constitute one apparatus.

According to the first embodiment of the present disclosure, it is possible to perform the tracking and photographing by using the optimal template of the target to be tracked.

According to the second embodiment of the present disclosure, it is possible to create the optimal template of the target to be tracked.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.
<Embodiment>
(Structure Example of Embodiment of Photographing Apparatus)

Figure 1:
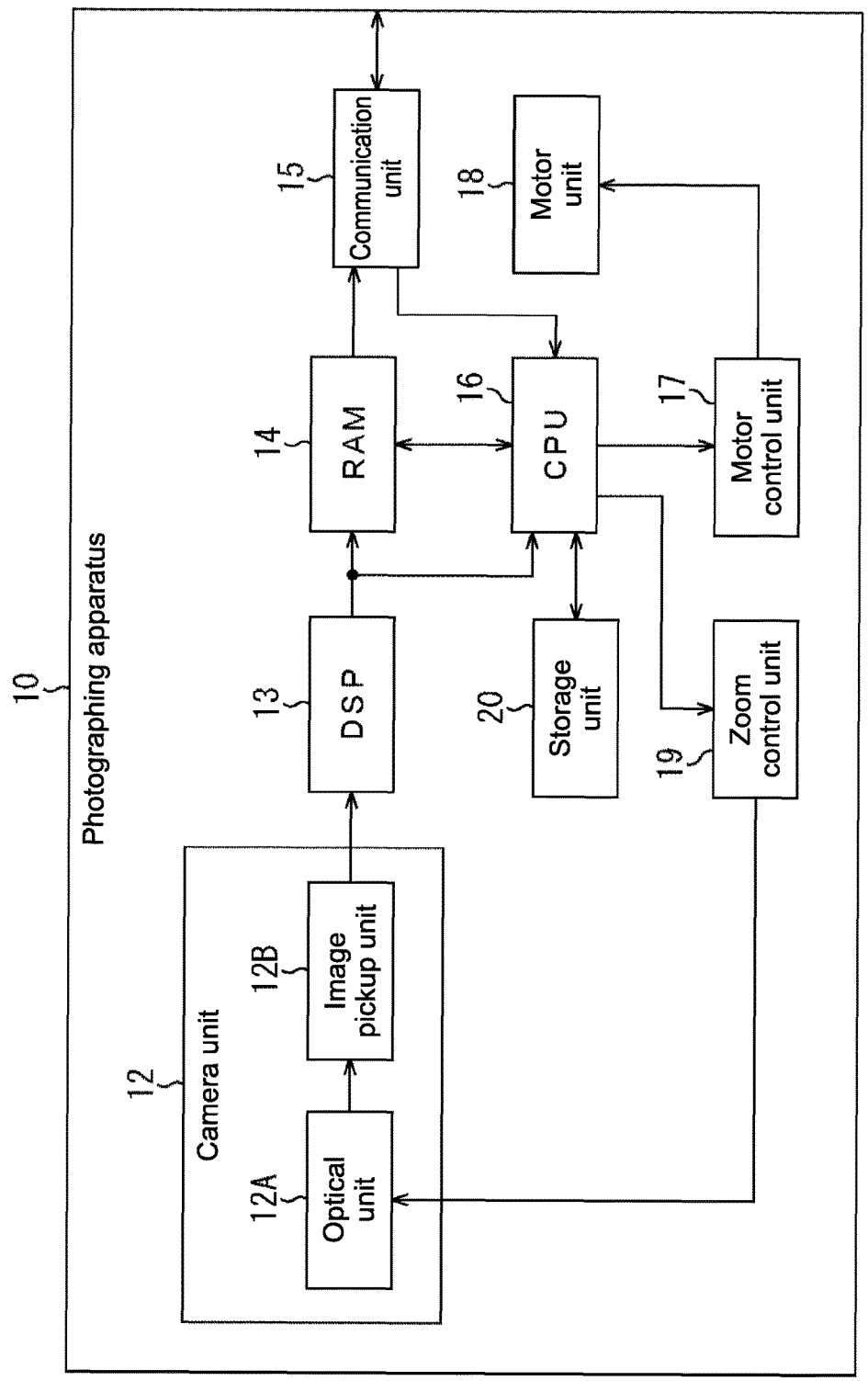
FIG. 1 is a block diagram showing a structure example of an embodiment of a photographing apparatus to which the present disclosure is applied.

FIG. 1 is a block diagram showing a structure example of an embodiment of a photographing apparatus to which the present disclosure is applied.

The photographing apparatus 10 shown in FIG. 1 is constituted of a camera unit 12, a DSP (Digital Signal Processing) 13, a RAM (Random Access Memory) 14, a communication unit 15, a CPU (Central Processing Unit) 16, a motor control unit 17, a motor unit 18, and a zoom control unit 19. The photographing apparatus 10 tracks and photographs a target to be tracked.

Specifically, the camera unit 12 is constituted of an optical unit 12A and an image pickup unit 12B. The optical unit 12A of the camera unit 12 is constituted of a zoom lens, a drive unit for driving the zoom lens, and the like. The drive unit of the optical unit 12A drives the zoom lens on the basis of a zoom control signal for controlling the zoom lens, which is supplied from the zoom control unit 19, and controls a magnification of a taken image. The zoom lens of the optical unit 12A forms an optical image of a subject on a photographing surface of the image pickup unit 12B.

The image pickup unit 12B is constituted of a CCD (Charge Coupled Device), a CMOS (Complementary Metal-Oxide Semiconductor) image sensor, or the like. The image pickup unit 12B generates a digital signal corresponding to the optical image by photoelectric conversion or the like and supplies the digital signal to the DSP 13 as the taken image.

The DSP 13 performs various signal processes such as a knee correction, a gamma correction, and a color correction with respect to the taken image supplied from the image pickup unit 12B. The DSP 13 supplies the taken image that has been subjected to the signal processes to the RAM 14 to cause the RAM 14 to temporarily store the image and supplies the image to the CPU 16.

The communication unit 15 transmits the taken image temporarily stored in the RAM 14 to an external display apparatus (not shown) or an external storage apparatus (not shown) via a network.

The CPU 16 performs various processes in accordance with a program stored in a storage unit 20. Specifically, the CPU 16 selects a target to be tracked from the taken image of a frame at the start of tracking and photographing, which is supplied from the DSP 13. Then, the CPU 16 creates an image of the target to be tracked in the taken image as a template of the target to be tracked, and creates an image of an area around the target to be tracked as a template of a background image. Then, the CPU 16 supplies the created template of the target to be tracked and the created template of the background image to the RAM 14 as initial templates and causes the RAM 14 to hold the templates.

Further, the CPU 16 learns, from the templates held in the RAM 14, a feature of the target to be tracked, such as color, and estimates the position of the target to be tracked in the taken image on the basis of the feature.

On the basis of the estimated position, the CPU 16 determines an orientation of the camera unit 12 in such a manner that the target to be tracked is disposed on the center of the taken image. Orientation information that indicates the orientation is supplied to the motor control unit 17. Further, on the basis of the determined orientation of the camera unit 12, the CPU 16 determines a magnification of the taken image in such a manner that a size of the target to be tracked in the taken image falls within a predetermined range, and supplies zoom magnification information that indicates the magnification to the zoom control unit 19.

Further, the CPU 16 calculates a similarity between a feature of the position of the target to be tracked in the taken image in a frame other than the frame at the start of the tracking and photographing and the feature used for the estimation of the position. The similarity indicates a likelihood of the target to be tracked.

On the basis of the similarity and the position of the target to be tracked, the CPU 16 creates the template of the target to be tracked and the template of the background image from the taken image in the frame other than the frame at the start of the tracking and photographing. The CPU 16 classifies the created template of the target to be tracked and the template of the background image into a long-term template and a short-term template, and supplies the classified templates to the RAM 14 to cause the RAM 14 to hold the templates.

It should be noted that the long-term template refers to a template updated at a longer interval, and the short-term template refers to a template updated at a shorter interval.

On the basis of the orientation information supplied from the CPU 16, the motor control unit 17 generates a motor control signal for setting the orientation of the camera unit 12 to the orientation indicated by the orientation information and supplies the signal to the motor unit 18.

The motor unit 18 is formed of a drive unit that drives the camera unit 12. On the basis of the motor control signal supplied from the motor control unit 17, the motor unit 18 performs panning and tilting for the camera unit 12, thereby changing the orientation of the camera unit 12.

On the basis of the zoom magnification information supplied from the CPU 16, the zoom control unit 19 generates a zoom control signal for performing photographing at a magnification indicated by the zoom magnification information and supplies the signal to the optical unit 12A.

The storage unit 20 is formed of a hard disk or the like and stores a program or the like executed by the CPU 16. The program is obtained by the communication unit 15 through a wired or wireless transmission medium such as a local area network, the Internet, and digital a satellite broadcast and installed to the storage unit 20 through the CPU 16.

It should be noted that the program executed by the CPU 16 can be recorded in a package medium or the like to be provided and installed to the storage unit 20. Further, the program can be installed to the storage unit 20 in advance.

The program executed by the CPU 16 may be a program for which processes are performed in a chronological order along a description in this specification or in parallel, or may be a program for which the processes are performed at necessary timing when called or the like.

(Outline of Tracking and Photographing)

Figure 2:
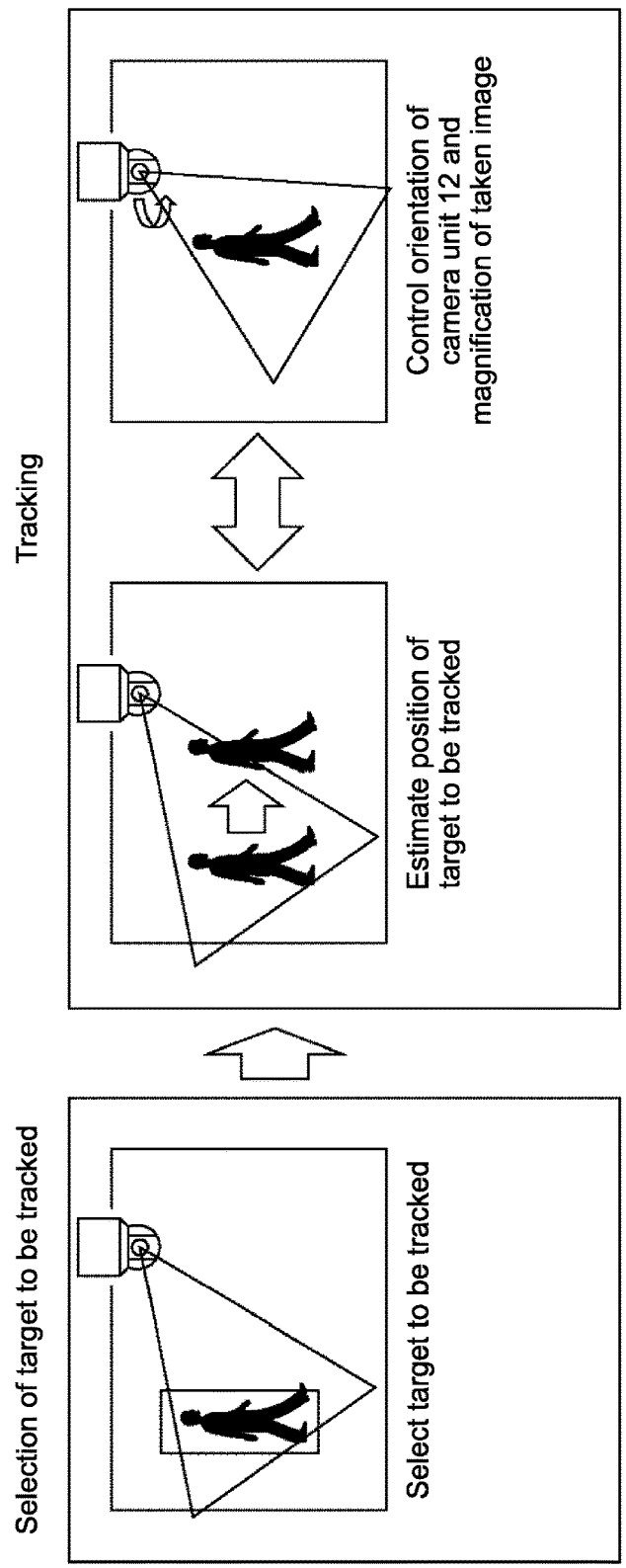
FIG. 2 is a diagram showing an outline of tracking and photographing performed in the photographing apparatus shown in FIG. 1.

FIG. 2 is a diagram for explaining the tracking and photographing performed by the photographing apparatus 10 shown in FIG. 1.

As shown in FIG. 2, in the tracking and photographing, first, the CPU 16 selects the target to be tracked from the taken image. Next, the CPU 16 uses the template of the selected target to be tracked to learn the feature of the target to be tracked and estimates the position of the target to be tracked from the taken image on the basis of the feature. Then, on the basis of the estimated position of the target to be tracked, the CPU 16 controls the orientation of the camera unit 12 and the magnification of the taken image in such a manner that the target to be tracked is disposed on the center of the taken image within a predetermined size range. As a result, the target to be tracked is disposed on the center of the taken image within the predetermined size range at all times.

(Structure example of CPU and RAM)

Figure 3:
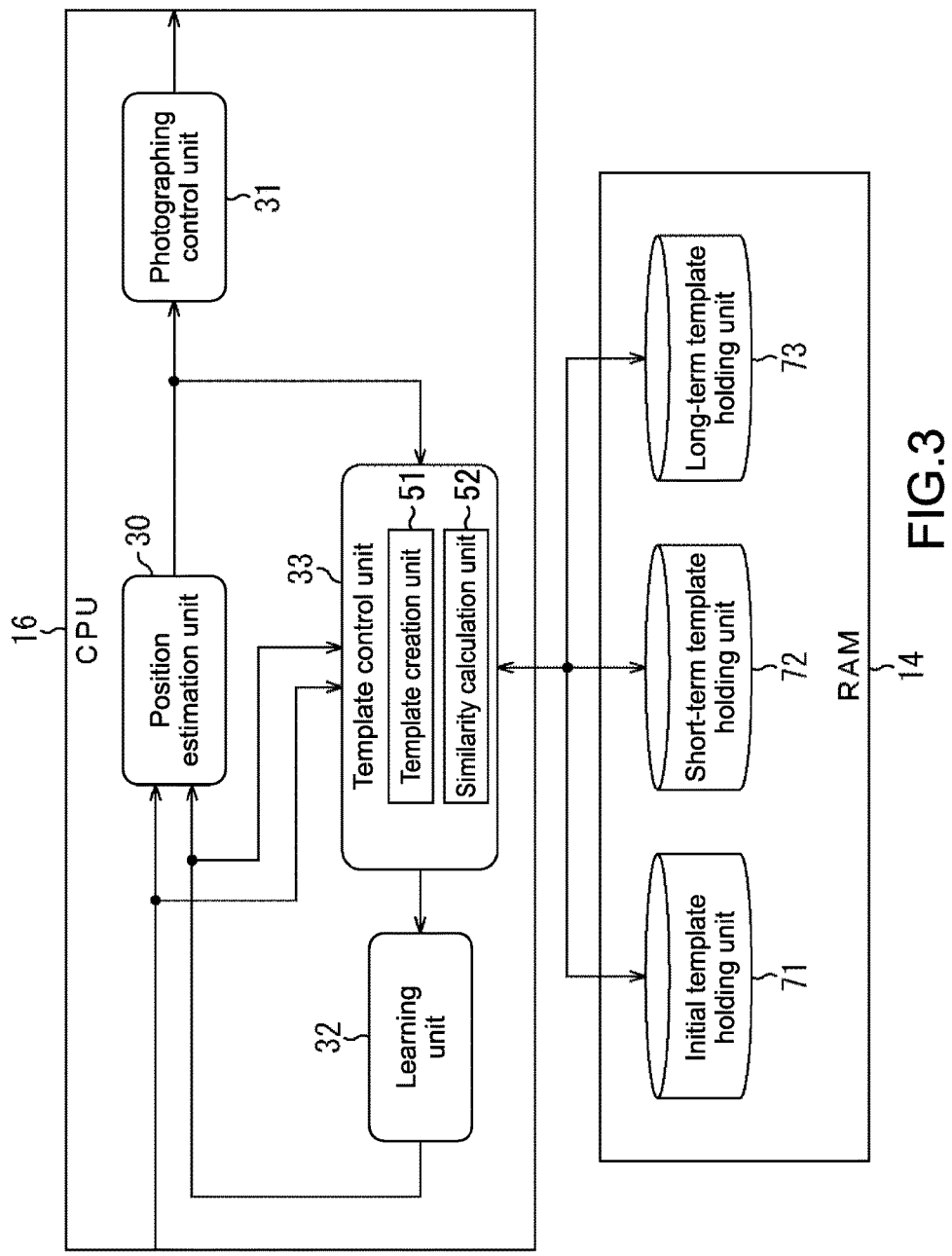
FIG. 3 is a block diagram showing a structure example of a CPU and a RAM shown in FIG. 1.

FIG. 3 is a block diagram showing a structure example of the CPU 16 and the RAM 14 shown in FIG. 1.

The CPU 16 shown in FIG. 3 is constituted of a position estimation unit 30, a photographing control unit 31, a learning unit 32, and a template control unit 33.

The position estimation unit 30 of the CPU 16 estimates the position of the target to be tracked in the taken image supplied from the DSP 13 shown in FIG. 1, on the basis of the feature supplied from the learning unit 32. Specifically, the position estimation unit 30 uses a particle filter to calculate the similarity of the feature learned with respect to each particle and estimate the position of the target to be tracked on the basis of a weighted mean of the similarities of the particles. The position estimation unit 30 supplies the position to the photographing control unit 31 and the template control unit 33.

On the basis of the position supplied from the position estimation unit 30, the photographing control unit 31 controls photographing by the camera unit 12. Specifically, on the basis of the position supplied from the position estimation unit 30, the photographing control unit 31 determines the orientation of the camera unit 12 in such a manner that the target to be tracked is disposed on the center of the taken image, and supplies orientation information that indicates the orientation to the motor control unit 17 (FIG. 1). Further, on the basis of the determined orientation of the camera unit 12, the photographing control unit 31 determines the magnification of the taken image in such a manner that the size of the target to be tracked in the taken image falls within a predetermined range, and supplies zoom magnification information that indicates the magnification to the zoom control unit 19.

The template control unit 33 is constituted of a template creation unit 51 and a similarity calculation unit 52.

The template creation unit 51 of the template control unit 33 selects the target to be tracked from the taken image in the frame at the start of the tracking and photographing which is supplied from the DSP 13. Then, the template creation unit 51 creates, from the taken image in the frame at the start of the tracking and photographing, the template of the selected target to be tracked and the template of the background image. The template creation unit 51 supplies the created template of the target to be tracked and the template of the back ground image to the RAM 14 as the initial templates and supplies the templates to the learning unit 32.

Further, on the basis of the similarity supplied from the similarity calculation unit 52 and the position supplied from the position estimation unit 30, the template creation unit 51 creates the template of the background image and the template of the target to be tracked from the taken image in the frame other than the frame at the start of the tracking and photographing. On the basis of the similarity, the template creation unit 51 classifies the template of the target to be tracked and the template of the background image into the long-term template or the short-term template and supplies the classified templates to the RAM 14.

Further, the template creation unit 51 reads the initial template, the short-term template, and the long-term template held in the RAM 14 and supplies the templates to the learning unit 32.

On the basis of the position supplied from the position estimation unit 30, the similarity calculation unit 52 calculates a similarity between the feature of the position of the target to be tracked in the taken image in the frame other than the frame at the start of the tracking and photographing which is supplied from the DSP 13 and the feature of the target to be tracked which is supplied from the learning unit 32. The similarity calculation unit 52 supplies the similarity to the template creation unit 51.

The learning unit 32 learns the feature of the target to be tracked, such as the color, from the template supplied from the template creation unit 51 of the template control unit 33 by boosting and supplies the feature to the position estimation unit 30 and the template control unit 33.

The RAM 14 is constituted of an initial template holding unit 71, a short-term template holding unit 72, and a long-term template holding unit 73.

The initial template holding unit 71 of the RAM 14 holds the initial template supplied from the template creation unit 51. The short-term template holding unit 72 uses the short-term template supplied from the template creation unit 51 to update the short-term template held.

Specifically, in the case where the short-term template holding unit 72 has available space, the short-term template holding unit 72 holds a new short-term template supplied from the template creation unit 51. On the other hand, in the case where the short-term template holding unit 72 does not have available space, the short-term template holding unit 72 deletes the oldest short-term template and holds the new short-term template instead of the oldest short-term template.

The long-term template holding unit 73 uses the long-term template supplied from the template creation unit 51 to updates the long-term template held, like the short-term template holding unit 72.

(Explanation on Template Classification)

Figure 4:
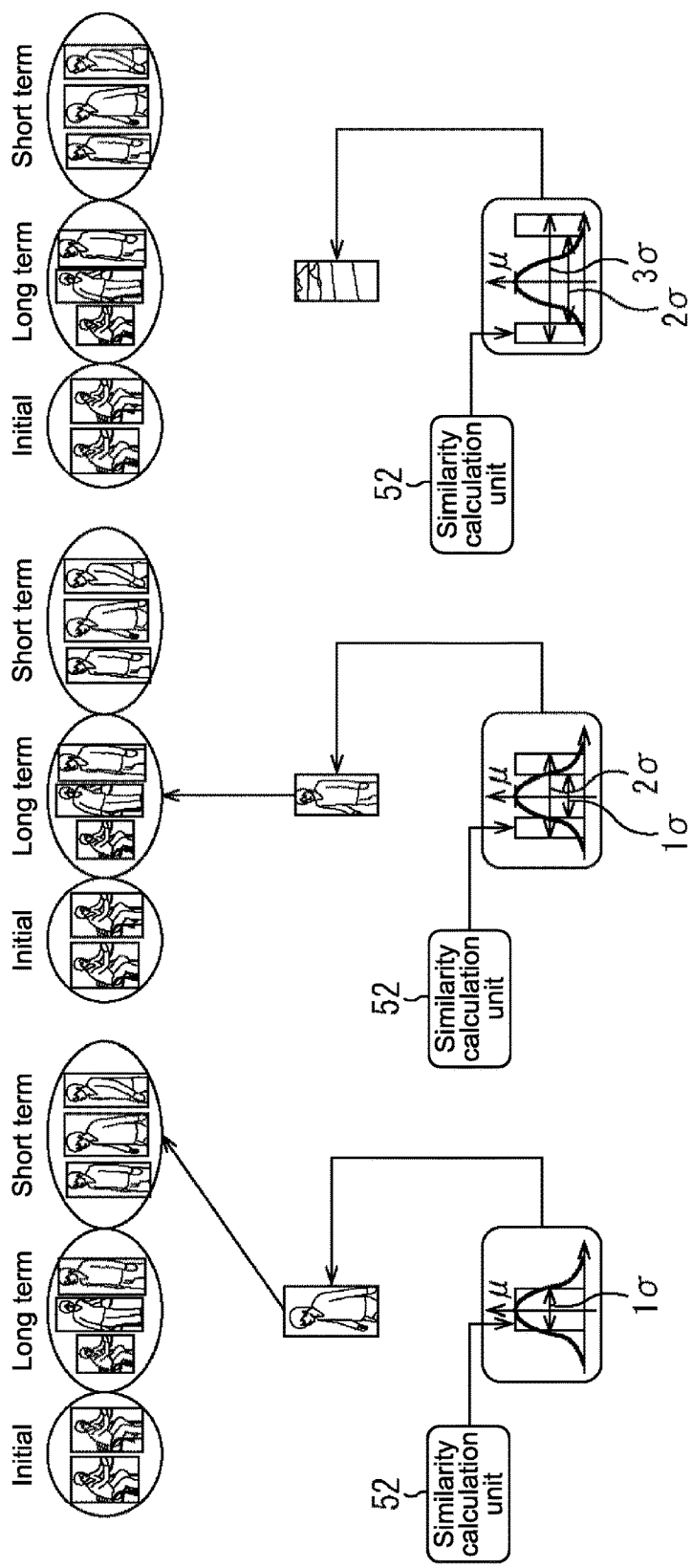
FIG. 4A-C is are diagrams for explaining classification of templates by a template creation unit shown in FIG. 3.

FIG. 4 is a diagram for explaining the classification of the templates by the template creation unit 51 shown in FIG. 3.

Graphs shown in FIG. 4 each indicate a probability density of a history of the similarities. As shown in the graphs of FIG. 4, it is possible to make an assumption that variation of the similarities follows a normal distribution.

In view of this, as shown in FIG. 4A, in the case where a distance between the similarity calculated by the similarity calculation unit 52 and an average value μ of the history of the similarities is equal to or less than β times a standard deviation σ (in the example of FIG. 4, β is 1), the template creation unit 51 classifies the template as the short-term template. That is, in the case where the similarity is a similarity with a high occurrence frequency, the template is classified as the short-term template updated at the shorter interval.

As a result, in the short-term template holding unit 72, the latest template at the time when the similarity is a normal value, that is, the feature of the target to be tracked does not vary largely. In the case where the feature of the target to be tracked does not vary largely, the feature of the target to be tracked is similar to the latest feature of the target to be tracked, so it is possible to accurately estimate the position of the target to be tracked by the short-term template.

On the other hand, as shown in FIG. 4B, in the case where the distance between the similarity calculated by the similarity calculation unit 52 and the average value μ exceeds β times the standard deviation σ and is equal to or less than α times the standard deviation σ (α>β) (in the example of FIG. 4, α is 2), the template is classified as the long-term template updated at a longer interval.

As a result, in the long-term template holding unit 73, the template in which the similarity is not the normal value, that is, the feature of the target to be tracked varies largely is held representatively. In the case where the feature of the target to be tracked varies largely, the feature of the target to be tracked is significantly different from the latest feature of the target to be tracked. Therefore, it may be impossible to estimate the target to be tracked accurately by the short-term template. However, in the case where the same feature is generated in the relatively remote past, it is possible to estimate the target to be tracked with the long-term template.

Further, as shown in FIG. 4C, in the case where the distance between the similarity calculated by the similarity calculation unit 52 and the average value μ exceeds α times the standard deviation σ, the template creation unit 51 does not create the template of a current frame. That is, in the case where the similarity is a similarity with an extremely low occurrence frequency, it is determined that the image other than the image of the target to be tracked (for example, background image or the like) is estimated as the position of the target to be tracked, and the template is voided.

As described above, the photographing apparatus 10 classifies the templates into the short-term template or the long-term template and holds the templates separately, thereby making it possible to efficiently hold the templates. That is, the photographing apparatus 10 can hold only the latest template which is useful in the case where the variation in the feature of the target to be tracked is small and the representative template in the relatively remote past, which is useful in the case where the variation in the feature of the target to be tracked is large. In contrast, if all the templates in the past are held, a large storage capacity of a memory for holding the templates and a large amount of processes of learning by using the templates are necessary. Further, if all the templates in the past are held, a large number of templates which are not useful are used for learning, with the result that a weight of the useful templates in the learning is reduced, and accuracy of the learning is deteriorated.

(Explanation on Process of Photographing Apparatus)

Figure 5:
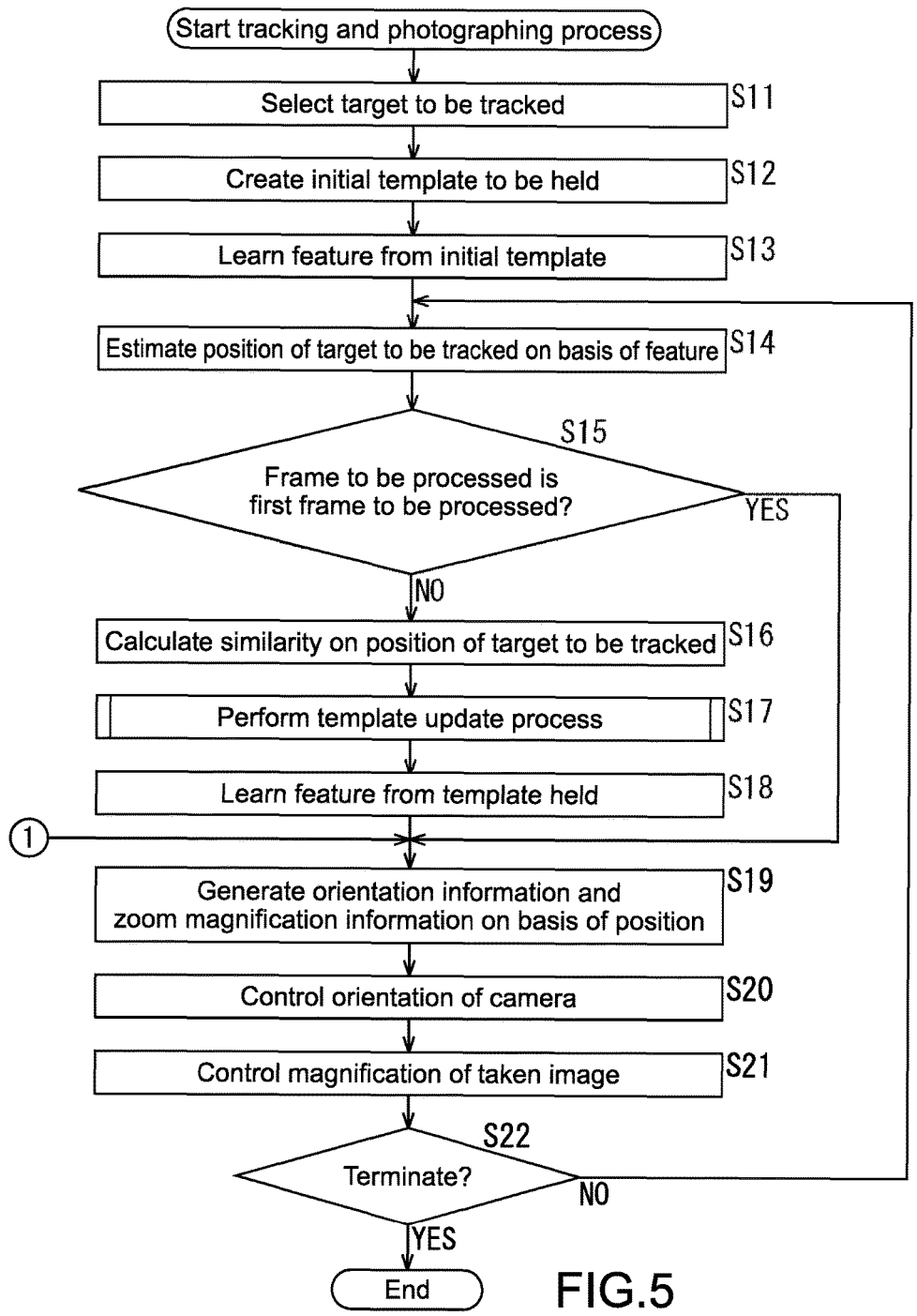
FIG. 5 is a flowchart for explaining a tracking and photographing process of the photographing apparatus.

FIG. 5 is a flowchart for explaining a tracking and photographing process by the photographing apparatus 10. The tracking and photographing process is started when the target to be tracked is specified by a surveillant during obtaining of the taken image by the camera unit 12.

In Step S11, the template creation unit 51 (FIG. 3) of the photographing apparatus 10 selects the target to be tracked specified by the surveillant from the taken images of the frame to be processed supplied from the DSP 13 of FIG. 1.

In Step S12, the template creation unit 51 creates, from the taken image of the frame to be processed, the template of the target to be tracked and the template of the background image and supplies the templates as the initial templates to the initial template holding unit 71 of the RAM 14 to cause the RAM 14 to hold the templates. Further, the template creation unit 51 supplies the initial templates to the learning unit 32.

In Step S13, the learning unit 32 learns the feature such as the color of the target to be tracked from the initial template supplied from the template creation unit 51 by boosting and supplies the feature to the position estimation unit 30 and the template control unit 33.

In Step S14, on the basis of the feature supplied from the learning unit 32, the position estimation unit 30 estimates the position of the target to be tracked in the taken image of the frame to be processed and supplies the position to the photographing control unit 31 and the template control unit 33.

In Step S15, the photographing apparatus 10 determines whether the frame to be processed is a first frame to be processed after the start of the tracking and photographing process or not. In Step S15, when it is determined that the frame to be processed is the first frame to be processed after the start of the tracking and photographing process, the process skips Steps S16 to S18 and proceeds to Step S19.

On the other hand, in Step S15, when it is determined that the frame to be processed is not the first frame to be processed after the start of the tracking and photographing process, the process proceeds to Step S16.

In Step S16, on the basis of the position supplied from the position estimation unit 30, the similarity calculation unit 52 calculates the similarity between the feature on the position of the target to be tracked in the taken image of the frame to be processed and the feature of the target to be tracked supplied from the learning unit 32. The similarity calculation unit 52 supplies the similarity to the template creation unit 51.

In Step S17, the template creation unit 51 performs a template update process of updating the templates held in the RAM 14 by using the taken image of the frame to be processed. The template update process will be described in detail later with reference to FIG. 6.

In Step S18, the learning unit 32 learns the feature such as the color of the target to be tracked from the initial templates, the short-term template, and the long-term template supplied from the template creation unit 51 by boosting. The learning unit 32 supplies the learned feature to the position estimation unit 30 and the template control unit 33 and causes the process to proceed to Step S19.

In Step S19, on the basis of the position supplied from the position estimation unit 30, the photographing control unit 31 generates the orientation information and the zoom magnification information. The photographing control unit 31 supplies the orientation information to the motor control unit 17 and supplies the zoom magnification information to the zoom control unit 19.

In Step S20, on the basis of the orientation information supplied from the photographing control unit 31, the motor control unit 17 generates a motor control signal and supplies the signal to the motor unit 18, thereby controlling the orientation of the camera unit 12.

In Step S21, on the basis of the zoom magnification information supplied from the photographing control unit 31, the zoom control unit 19 generates a zoom control signal and supplies the signal to the optical unit 12A, thereby controlling the magnification of the taken image.

Through the process of Steps S20 and S21, the taken image in which the target to be tracked is disposed on the center thereof within a predetermined size range is obtained by the camera unit 12 as the taken image of a frame subsequent to the current frame to be processed.

In Step S22, the photographing apparatus 10 determines whether to terminate the tracking and photographing process or not. Specifically, in the case where a state in which the update of the template is not performed occurs in succession a predetermined number of times or more in the template update process, the photographing apparatus 10 determines that the target to be tracked exists outside a photographing range for a predetermined time period or longer, thereby determining to terminate the tracking and photographing process.

On the other hand, in the case where the state in which the update of the template does not occur successively the predetermined number of times or more in the template update process, the photographing apparatus 10 determines that the tracking and photographing process is not terminated.

In Step S22, in the case where it is determined that the tracking and photographing process is not terminated, the process returns to Step S14 and sets a frame subsequent to the current frame to be processed as a new frame to be processed. The, the process from the Steps S14 to S22 is repeatedly performed until the tracking and photographing is determined to be terminated.

On the other hand, in Step S22, in the case where it is determined that the tracking and photographing process is to be terminated, the process is terminated.

Figure 6:
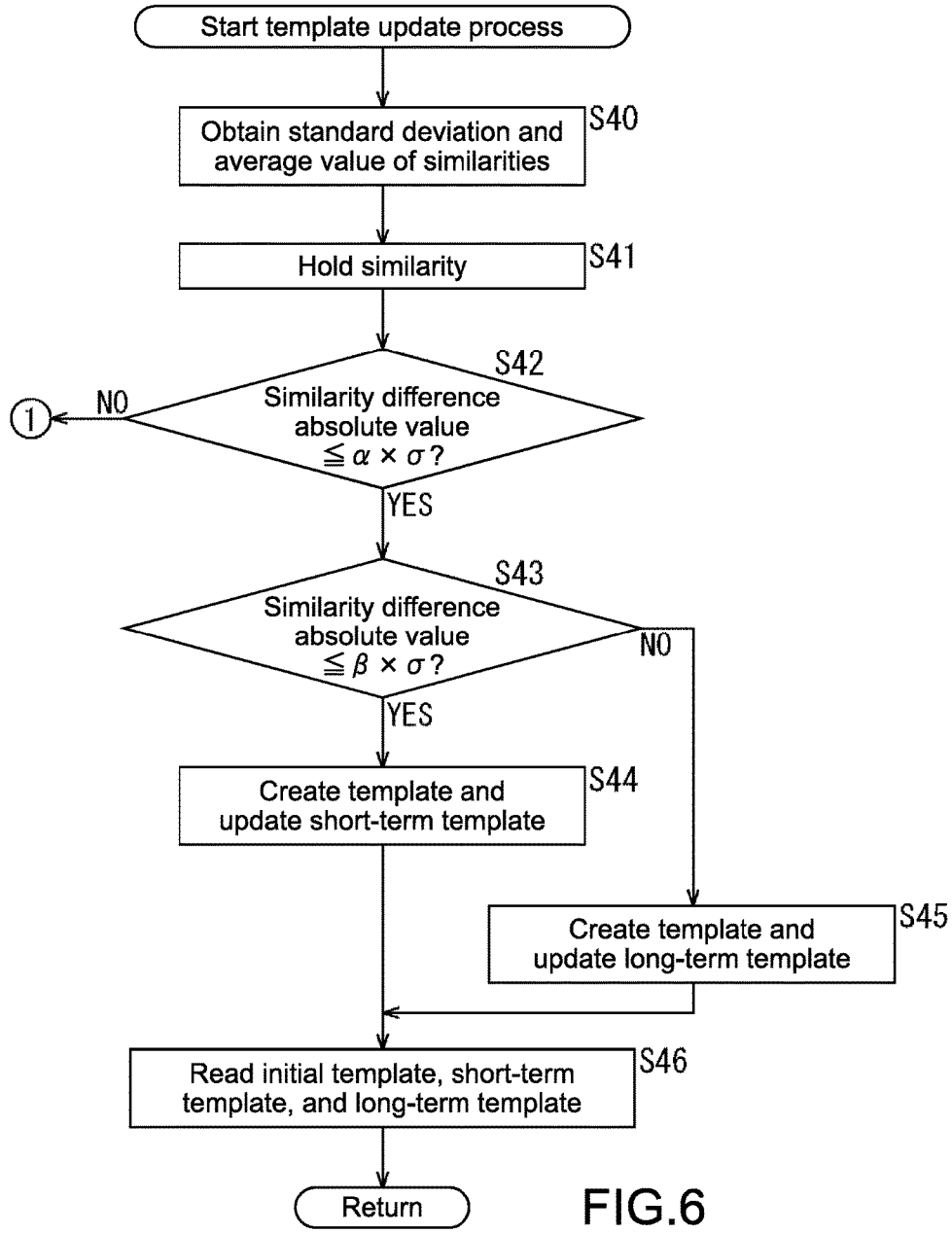
FIG. 6 is a flowchart for explaining details of an updating process for a template in FIG. 5.

FIG. 6 is a flowchart for explaining the template update process in Step S17 of FIG. 5 in detail.

In Step S40 of FIG. 6, the template creation unit 51 determines the average value μ and the standard deviation σ of the similarities of the frames prior to the frame to be processed held. In Step S41, the template creation unit 51 holds the similarity of the frames to be processed supplied from the similarity calculation unit 52.

In Step S42, the template creation unit 51 determines whether an absolute value of a value obtained by subtracting the average value μ from the similarity of the frames to be processed (hereinafter, referred to as similarity difference absolute value) is equal to or less than α times the standard deviation σ.

In the case where the similarity difference absolute value is determined to be equal to or less than α times the standard deviation σ in Step S42, the template creation unit 51 determines whether the similarity difference absolute value is equal to or less than β times the standard deviation σ in Step S43.

In Step S43, in the case where the similarity difference absolute value is determined to be equal to or less than β times the standard deviation σ, the process proceeds to Step S44. In Step S44, on the basis of the position of the target to be tracked, the template creation unit 51 creates the template of the target to be tracked and the template of the background image from the taken image of the frame to be processed and updates the short-term template.

Specifically, the template creation unit 51 supplies the template of the target to be tracked and the template of the background image to the short-term template holding unit 72 and causes the unit to hold the templates, thereby updating the short-term template of the short-term template holding unit 72. Then, the process proceeds to Step S46.

On the other hand, in Step S43, in the case where it is determined that the similarity difference absolute value is not equal to or less than β times the standard deviation σ, that is, in the case where the similarity difference absolute value is more than β times the standard deviation σ and equal to or less than α times the standard deviation σ, the process proceeds to Step S45.

In Step S45, on the basis of the position of the target to be tracked, the template creation unit 51 creates the template of the target to be tracked and template of the background image from the taken image of the frame to be processed and updates the long-term template.

Specifically, the template creation unit 51 supplies the template of the target to be tracked and the template of the background image to the long-term template holding unit 73 and causes the unit to hold the templates, thereby updating the long-term template of the long-term template holding unit 73. Then, the process proceeds to Step S46.

In Step S46, the template creation unit 51 reads the initial templates and the short-term and long-term templates held in the RAM 14 and supplies the templates to the learning unit 32. Then, the process returns to Step S17 of FIG. 5 and proceeds to Step S18.

Further, in Step S42, in the case where the similarity difference absolute value is determined to be more than α times the standard deviation σ, the template is not created, and the process proceeds to Step S19 of FIG. 5.

As described above, because the photographing apparatus 10 holds the templates of the target to be tracked created from the taken image with the templates of the target to be tracked classified into the long-term template and the short-term template, it is possible to create an optimal template of the target to be tracked.

Further, the photographing apparatus 10 uses the long-term template and the short-term template to estimate the position of the target to be tracked in the taken image and control photographing on the basis of the position. Therefore, it is possible to perform the tracking and photographing by using the optimal template of the target to be tracked. As a result, it is possible to estimate the position of the target to be tracked where the variation in posture or brightness is caused with high accuracy and perform the tracking and photographing.

It should be noted that, the photographing apparatus 10 may be provided with a plurality of fixed camera units and may select one of the camera units which performs photographing in such a manner that the target to be tracked is disposed on the center of the taken image.

Further, the numbers of templates which can be held by the short-term template holding unit 72 and the long-term template holding unit 73 are determined on the basis of a specification of the tracking and photographing, a supposed content of the taken image, a tolerance of a process load of the CPU 16, or the like. The number of templates which can be held by the short-term template holding unit 72 and the number of templates which can be held by the long-term template holding unit 73 may be the same or different.

Further, one or more templates of the target to be tracked may be created from the taken image of one frame. The same holds true for the number of templates of the background image.

Further, the learning unit 32 may perform weighting for the initial, short-term, and long-term templates to use those templates for learning. Further, the learning unit 32 does not have to use all of the initial, short-term, and long-term templates.

Further, in the above description, the template of the background image is held along with the template of the target to be tracked with the templates classified into the initial template, the short-term template, or the long-term template. However, the template of the background image may be held separately from the template of the target to be tracked. In this case, the template of the background image may be updated on a one-frame basis or may be updated every multiple frames.

Further, in the above description, the photographing apparatus 10 also creates the templates. However, another apparatus may create the templates. In this case, for example, the template control unit 33, the initial template holding unit 71, the short-term template holding unit 72, and the long-term template holding unit 73 are provided not to the photographing apparatus 10 but to an external apparatus.

Further, in the above description, the tracking and photographing process is started when the target to be tracked is specified by the surveillant. However, the process may be started when a sensor (not shown) detects a moving object or abnormality. In this case, the target to be tracked is selected by the template creation unit 51 by a predetermined method.

It should be noted that, the present disclosure is not limited to the above embodiments and can be variously modified without departing from the gist of the present disclosure.

For example, the present technology can have the structure of cloud computing in which a plurality of apparatuses share one function via a network and perform processes in cooperation with each other.

Further, the steps explained in the flowcharts described above can be shared by one apparatus or by a plurality of apparatuses.

Further, in the case where one step includes a plurality of processes, the plurality of processes included in the one step can be performed by one apparatus or shaped by a plurality of apparatuses.

It should be noted that the present disclosure can take the following configurations.

(1) A photographing apparatus, including:

a position estimation unit configured to use a long-term template of a target to be tracked and a short-term template of the target to be tracked, which are created from a past taken image, to estimate a position of the target to be tracked in a current taken image, the long-term template being a template updated at a longer interval, the short-term template being a template updated at a shorter interval; and a photographing control unit configured to control photographing on the basis of the position estimated by the position estimation unit.

(2) The photographing apparatus according to Item (1), in which the long-term template is a template at a time when a similarity between the target to be tracked in the past taken image used to create the templates and the long-term template and the short-term template that are created from a taken image obtained in a remoter past as compared to the past taken image is larger than a first threshold value, and the short-term template is a template at a time when the similarity is equal to or smaller than the first threshold value.

(3) The photographing apparatus according to Item (2), in which the first threshold value is a value based on a history of the similarity.

(4) The photographing apparatus according to Item (2) or (3), in which the long-term template is a template at a time when the similarity is larger than the first threshold value and equal to or smaller than a second threshold value.

(5) The photographing apparatus according to Item (4), in which the second threshold value is a value based on a history of the similarity.

(6) The photographing apparatus according to any one of Items (1) to (5), in which the position estimation unit uses an initial template which is the template of the target to be tracked created from a taken image at a start of tracking, to estimate the position of the target to be tracked.

(7) A photographing method, including:

using, by a photographing apparatus, a long-term template of a target to be tracked and a short-term template of the target to be tracked, which are created from a past taken image, to estimate a position of the target to be tracked in a current taken image, the long-term template being a template updated at a longer interval, the short-term template being a template updated at a shorter interval; and controlling photographing by the photographing apparatus on the basis of the position estimated in the estimating of the position.

(8) A program for causing a computer to function as a position estimation unit configured to use a long-term template of a target to be tracked and a short-term template of the target to be tracked, which are created from a past taken image, to estimate a position of the target to be tracked in a current taken image, the long-term template being a template updated at a longer interval, the short-term template being a template updated at a shorter interval, and a photographing control unit configured to control photographing on the basis of the position estimated by the position estimation unit.

(9) A template creation apparatus, including:

a template creation unit configured to create a template of a target to be tracked from a taken image; and a holding unit configured to hold the template created by the template creation unit with the template classified as one of a long-term template updated at a longer interval and a short-term template updated at a shorter interval.

(10) The template creation apparatus according to Item (9), further including a similarity calculation unit configured to calculate a similarity between the target to be tracked in the taken image used to create the template and the long-term template and the short-term template that are created from a taken image obtained in a remoter past as compared to the taken image, in which when the similarity is larger than a first threshold value, the holding unit holds the template with the template classified as the long-term template, and when the similarity is equal to or smaller than the first threshold value, the holding unit holds the template with the template classified as the short-term template.

(11) The template creation apparatus according to Item (10), in which
the first threshold value is a value based on a history of the similarity.

(12) The template creation apparatus according to Item (10) or (11), in which
when the similarity is larger than the first threshold value and equal to or smaller than a second threshold value, the holding unit holds the template with the template classified as the long-term template.

(13) The template creation apparatus according to Item (12), in which
the second threshold value is a value based on a history of the similarity.

(14) The template creation apparatus according to any one of Items (9) to (13), in which
the holding unit holds the template created from the taken image at a start of tracking with the template classified as an initial template.

(15) A template creation method, including:
creating a template of a target to be tracked from a taken image by a template creation apparatus; and
classifying the template created as one of a long-term template updated at a longer interval and a short-term template updated at a shorter interval and holding the template by the template creation apparatus.

(16) A program for causing a computer to function as
a template creation unit configured to create a template of a target to be tracked from a taken image, and
a holding control unit configured to cause the template created by the template creation unit to be classified as one of a long-term template updated at a longer interval and a short-term template updated at a shorter interval and held.

It should be understood by those skilled in the art that various modifications, combinations, sub-combinations and alterations may occur depending on design requirements and other factors insofar as they are within the scope of the appended claims or the equivalents thereof.

What is claimed is:

1. A photographing apparatus comprising:
a memory; and
an electronic processor configured to
generate a template of a target to be tracked from a first image portion of a taken image,
generate a template of a background image from a second image portion of the taken image, the second image portion different from and around the first image portion,
determine whether the taken image is a first image in tracking and photographing,
responsive to determining that the taken image is the first image in the tracking and photographing, classify the template of the target to be tracked and the template of the background image together as an initial template,
responsive to determining that the taken image is not the first image in the tracking and photographing, classify the template of the target to be tracked and the template of the background image together as one of a long-term template or a short-term template, the long-term template being updated at a longer interval, the short-term template being updated at a shorter interval than the longer interval,
control the memory to hold the initial template,
detect a feature of the target to be tracked from the initial template,
estimate a position of the target to be tracked in the taken image based on the feature that is detected, and
control photographing based on the position that is estimated.

2. The photographing apparatus according to claim 1, wherein
to classify the template of the target to be tracked and the template of the background image together as the one of the long-term template or the short-term template, the electronic processor is further configured to
compare a similarity and a position between the target to be tracked in the taken image and a second target to be tracked in a past taken image,
classify the template of the target to be tracked and the template of the background image as the long-term template when the similarity and the position between the target to be tracked in the taken image and the target to be tracked in the past taken image is larger than a first threshold value, and
classify the template of the target to be tracked and the template of the background image as the short-term template when the similarity and the position between the target to be tracked in the taken image and the target to be tracked in the past taken image is equal to or smaller than the first threshold value.

3. The photographing apparatus according to claim 2, wherein the first threshold value is a value based on a history of the similarity.

4. The photographing apparatus according to claim 2, wherein the template of the target to be tracked and the template of the background image are classified as the long-term template when the similarity and the position is larger than the first threshold value and equal to or smaller than a second threshold value.

5. The photographing apparatus according to claim 4, wherein the second threshold value is a value based on a history of the similarity.

6. The photographing apparatus according to claim 1, wherein
the electronic processor is further configured to
control the memory to hold at least one of the long-term template or the short-term template,
detect the feature of the target to be tracked from the at least one of the long-term template or the short-term template,
estimate a second position of the target to be tracked in the taken image based on the feature that is detected in the at least one of the long-term template or the short-term template, and
control the photographing based on the second position that is estimated.

7. A photographing method comprising:
generating, with an electronic processor, a template of a target to be tracked from a first image portion of a taken image;
generating, with the electronic processor, a template of a background image from a second image portion of the taken image, the second image portion different from and around the first image portion;
determining whether the taken image is a first image in tracking and photographing;
classifying the template of the target to be tracked and the template of the background image together as an initial template in response to determining that the taken image is the first image in the tracking and photographing;

classifying the template of the target to be tracked and the template of the background image together as one of a long-term template or a short-term template in response to determining that the taken image is not the first image in the tracking and photographing, the long-term template being updated at a longer interval, the short-term template being updated at a shorter interval than the longer interval, controlling a memory to hold the initial template;

detecting a feature of the target to be tracked from the initial template;

estimating a position of the target to be tracked in the taken image based on the feature that is detected; and controlling, with the electronic processor, photographing based on the position that is estimated.

8. A non-transitory computer-readable medium having instructions that, when executed by an electronic processor, perform a set of functions comprising:

generating a template of a target to be tracked from a first image portion of a taken image;

generating a template of a background image from a second image portion of the taken image, the second image portion different from and around the first image portion;

determining whether the taken image is a first image in tracking and photographing, classifying the template of the target to be tracked and the template of the background image together as an initial template in response to determining that the taken image is the first image in the tracking and photographing, classifying the template of the target to be tracked and the template of the background image together as one of a long-term template or a short-term template in response to determining that the taken image is not the first image in the tracking and photographing, the long-term template being updated at a longer interval, the short-term template being updated at a shorter interval than the longer interval, controlling a memory to hold the initial template;

detecting a feature of the target to be tracked from the initial template;

estimating a position of the target to be tracked in the taken image based on the feature that is detected; and controlling photographing based on the position that is estimated.

9. A template creation apparatus comprising:

an electronic processor that is configured to create a template of a target to be tracked from a first image portion of a taken image, and create a template of a background image from a second image portion of the taken image, the second image portion different from and around the first image portion, determine whether the taken image is a first image in tracking and photographing, responsive to determining that the taken image is the first image in the tracking and photographing, classify the template of the target to be tracked and the template of the background image together as an initial template, and responsive to determining that the taken image is not the first image in the tracking and photographing, classify the template of the target to be tracked and the template of the background image together as one of a long-term template or a short-term template, the long-term template being updated at a longer interval, the short-term template being updated at a shorter interval than the longer interval; and a memory configured to hold one or more initial templates, one or more long-term templates, and one or more short-term templates.

10. The template creation apparatus according to claim 9, wherein to classify the template of the target to be tracked and the template of the background image together as the one of the long-term template or the short-term template, the electronic processor is further configured to compare a similarity and a position between the target to be tracked in the taken image and a second target to be tracked in a past taken image, classify the template of the target to be tracked and the template of the background image as the long-term template when the similarity and the position between the target to be tracked in the taken image and the target to be tracked in the past taken image is larger than a first threshold value, and classify the template of the target to be tracked and the template of the background image as the short-term template when the similarity and the position between the target to be tracked in the taken image and the target to be tracked in the past taken image is equal to or smaller than the first threshold value.

11. The template creation apparatus according to claim 10, wherein the first threshold value is a value based on a history of the similarity.

12. The template creation apparatus according to claim 10, wherein when the similarity and the position is larger than the first threshold value and equal to or smaller than a second threshold value, the memory is configured to hold the template with the template classified as the long-term template.

13. The template creation apparatus according to claim 12, wherein the second threshold value is a value based on a history of the similarity.

14. A template creation method, the method comprising:

creating, with an electronic processor, a template of a target to be tracked from a first image portion of a taken image;

creating, with the electronic processor, a template of a background image from a second image portion of the taken image, the second image portion different from and around the first image portion;

determining whether the taken image is a first image in tracking and photographing;

classifying the template of the target to be tracked and the template of the background image together as an initial template in response to determining that the taken image is the first image in the tracking and photographing;

classifying the template of the target to be tracked and the template of the background image together as one of a long-term template or a short-term template in response to determining that the taken image is not the first image in the tracking and photographing, the long-term template being updated at a longer interval, the short-term template being updated at a shorter interval than the longer interval; and controlling a memory to hold one or more initial templates, one or more long-term templates, and one or more short-term templates.

15. A non-transitory computer-readable medium having instructions that, when executed by an electronic processor, perform a set of functions comprising:
creating a template of a target to be tracked from a first image portion of a taken image;
creating a template of a background image from a second image portion of the taken image, the second image portion different from and around the first image portion;
determining whether the taken image is a first image in tracking and photographing;
classifying the template of the target to be tracked and the template of the background image together as an initial template in response to determining that the taken image is the first image in the tracking and photographing;
classifying the template of the target to be tracked and the template of the background image together as one of a long-term template or a short-term template in response to determining that the taken image is not the first image in the tracking and photographing, the long-term template being updated at a longer interval, the short-term template being updated at a shorter interval than the longer interval; and
controlling a memory to hold one or more initial templates, one or more long-term templates, and one or more short-term templates.

16. A photographing apparatus comprising:
a camera configured to output an image that includes a target to be tracked; and
an electronic processor configured to
generate an initial template of the target to be tracked using a portion of the image that includes the target to be tracked,
learn a feature of the target to be tracked from at least the initial template of the target to be tracked,
estimate a position of the target to be tracked based on the feature,
determine an orientation of the camera based on the position of the target to be tracked, wherein the orientation of the camera centers the target to be tracked in the image,
output a motor control signal based on the orientation of the camera to a motor,
determine whether a frame of the image is a first frame of the image,
responsive to determining that the frame of the image is not the first frame of the image, calculate a similarity between a feature of the target to be tracked in the frame of the image and the feature of the target to be tracked from at least the initial template of the target to be tracked,
generate a template of a background image that is an area around the target to be tracked using a first portion of the frame of the image based at least in part on the similarity;
generate a template of the target to be tracked using a second portion of the frame of the image based at least in part on the similarity, and
classify the template of the background image and the template of the target to be tracked as one of a long-term template or a short-term template,
wherein the short-term template is a classification when the similarity is equal to or smaller than a first threshold value.

17. A photographing method comprising:
outputting, with a camera, an image that includes a target to be tracked; generating, with an electronic processor, an initial template of the target to be tracked using a portion of the image that includes the target to be tracked;
learning, with the electronic processor, a feature of the target to be tracked from at least the initial template of the target to be tracked;
estimating, with the electronic processor, a position of the target to be tracked based on the feature;
determining, with the electronic processor, an orientation of the camera based on the position of the target to be tracked,
wherein the orientation of the camera centers the target to be tracked in the image;
outputting, with the electronic processor, a motor control signal based on the orientation of the camera to a motor;
determining whether a frame of the image is a first frame of the image;
responsive to determining that the frame of the image is not the first frame of the image, calculating a similarity between a feature of the target to be tracked in the frame of the image and the feature of the target to be tracked from at least the initial template of the target to be tracked;
generating a template of a background image that surrounds the target to be tracked using a first portion of the frame of the image based at least in part on the similarity;
generating a template of the target to be tracked using a second portion of the frame of the image based at least in part on the similarity; and
classifying the template of the background image and the template of the target to be tracked as one of a long-term template or a short-term template,
wherein the short-term template is a classification when the similarity is equal to or smaller than a first threshold value.

18. A non-transitory computer-readable medium having instructions that, when executed by an electronic processor, perform a set of functions comprising:
generating an initial template of a target to be tracked using a portion of an image that includes the target to be tracked;
learning a feature of the target to be tracked from at least the initial template of the target to be tracked;
estimating a position of the target to be tracked based on the feature;
determining an orientation of a camera based on the position of the target to be tracked,
wherein the orientation of the camera centers the target to be tracked in the image; and
outputting a motor control signal based on the orientation of the camera to a motor;
determining whether a frame of the image is a first frame of the image;
responsive to determining that the frame of the image is not the first frame of the image, calculating a similarity between a feature of the target to be tracked in the frame of the image and the feature of the target to be tracked from at least the initial template of the target to be tracked;
generating a template of a background image that surrounds the target to be tracked using a first portion of the frame of the image based at least in part on the similarity;

generating a template of the target to be tracked using a second portion of the frame of the image based at least in part on the similarity; and classifying the template of the background image and the template of the target to be tracked as one of a long-term template or a short-term template, wherein the short-term template is a classification when the similarity is equal to or smaller than a first threshold value.

* * * * *